3,048,606
NEW 11-ALKYLATED STEROIDS AND PROCESS
FOR PREPARING SAME
Albert Wettstein and Georg Anner, Basel, Switzerland, assignors to Ciba Corporation, a corporation of Delaware
No Drawing. Filed July 3, 1958, Ser. No. 746,344
Claims priority, application Switzerland July 5, 1957
6 Claims. (Cl. 260—397.45)

This invention relates to new steroid compounds. More particularly it concerns steroids which contain a methyl radical in the 11-position, and of which the structure of ring C is characterized by the following formulae

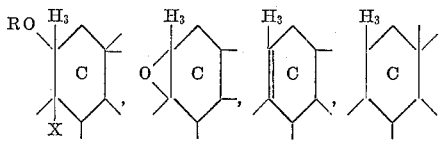

in which R represents hydrogen or an acid radical, and X represents hydrogen, a hydroxyl group or a halogen atom.

The invention also provides a process for the manufacture of the aforesaid new steroids containing a methyl radical in the 11-position, wherein an 11-keto-steroid is reacted with a methyl metal compound, and, if desired, in the reaction product so obtained the 11-hydroxyl group is split off with the formation of a 9:11-double bond, hydrogen, a hypohalous acid, two hydroxy groups or oxygen are additively combined at the 9:11-double bond, and if desired, a 9:11-halogen hydrin so obtained is subjected to the action of an agent capable of splitting off hydrogen halide and a 9:11-oxido-compound so obtained is hydrolyzed to a 9:11-halogen hydrin or a 9:11-dihydroxy-compound.

As starting materials for the present process there are used more especially 11-keto-steroids of the 5-allo-series for example, 11-keto-spirostanes, 11-keto-cholestanes, 11-keto-ergostanes, 11-keto-stigmastanes, or 11-keto-allopregnanes, and also their 16:17-unsaturated and 16:17-oxido-derivatives, 11-keto-androstanes, and also the 19-nor-derivatives of the aforesaid fundamental substances. Specific, and especially important, starting materials are, for example, 11-keto-tigogenin obtainable from hecogenin and esters and ethers thereof, such as its 3-tetrahydropyranyl ether or 3-benzyl ether, and the allopregnane-11:20-diones obtainable therefrom which contain in the 3-position a free or functionally converted hydroxyl group, for example, a hydroxyl group esterified with a carboxylic acid or a hydroxyl group etherified with an alcohol, for example a tetrahydropyranylhydroxy- or benzyloxy-group, or a protected, for example, ketalized, oxo group, and in the 17- and/or 21-position a hydrogen atom or a free, esterified or etherified hydroxyl group. The ester radicals are, for example, those of saturated or unsaturated aliphatic or cycloaliphatic, aromatic or heterocyclic carboxylic acids, such as those of formic acid, acetic acid, propionic acid, butyric acids, valeric acids such as n-valeric acid, or trimethylacetic acid, caproic acids such as β-trimethylpropionic acid, oenanthic, caprylic, pelargonic, capric, undecylic acids, such as undecylenic acid, lauric, myristic, palmitic or stearic acids, for example of oleic acid, cyclopentyl, cyclohexyl or phenylacetic acids or phenyl propionic acids, of benzoic acids, phenoxy-alkane acids such as phenoxyacetic acid, para-chloro-phenoxyacetic acid, 2:4-dichloro-phenoxyacetic acid, 4-tertiary butyl-phenoxyacetic acid, 3-phenoxypropionic acid, 4-phenoxybutyric acid, of furane-2-carboxylic acid, 5-tertiary butyl-furane-2-carboxylic acid, 5-bromo-furane-2-carboxylic acid, of nicotinic acids; of dicarboxylic acids such as oxalic, succinic or glutaric acids; of substituted carboxylic acids such as β-keto-carboxylic acids, e.g. acetoacetic, propionylacetic, butyrylacetic or caprylacetic acid, or of amino acids and the like. Instead of carboxylic acid radicals there may be present those of sulfonic acids, phosphoric, sulfuric or hydrohalic acids. If the starting material contains, in addition to the 11-keto group, other free keto groups which are not intended to react with the organo-metal compound, for example, in the 3 and/or 20 position, such keto groups are protected before the reaction, by conversion into ketone derivatives, especially into ketals for example, into ethylene ketals. Compounds containing keto groups can also be made by reducing the keto groups in the starting material to hydroxyl groups prior to the reaction with the organo-metal compound and subsequently reconverting the hydroxyl groups into keto groups by oxidation. The starting materials may also contain any double bonds, for example, in the 1-, 4-, 5-, 6-, 7-, 8-, 14-, 15-, 16-, 17-, 20- or 20:21-position. They may also contain any other desired substituents, especially those which do not react with the methyl metal compound.

For reaction with the 11-keto-steroids in a process of this invention there are used methyl metal compounds, for example, appropriate Grignard or alkali metal compounds, such as methyl magnesium chloride, bromide or iodide, or lithium-methyl. Since the 11-keto group is relatively slow to react, long reaction periods are usually necessary for the reaction with the organo-metal compounds. The reaction can be accelerated, that is to say, the reaction period shortened, for example, by using a high boiling solvent, such as di-isobutyl ether, tetrahydrofurane or dioxane.

In order to split off the 11-hydroxyl group with the formation of a 9:11-unsaturated steroid substituted in the 11-position by a methyl radical, the usual agents capable of eliminating water may be used, for example, phosphorus oxychloride in an organic base such as pyridine, an organic carboxylic or sulfonic acid in the presence of hydrogen chloride or hydrogen bromide, or an N-halogenamide or -imide, such as N-bromacetamide or N-bromosuccinimide, in an organic base such as pyridine, in the presence of sulfur dioxide.

The saturation of the 9:11-double bond in the 9:11-unsaturated steroid substituted in the 11-position by a methyl radical is carried out by means of catalytically activated hydrogen, for example, in the presence of a platinum, palladium or nickel catalyst.

In order to bring about the additive combination of a hypohalous acid at the 9:11-double bond, the 9:11-unsaturated steroid substituted in the 11-position by a methyl radical may be treated with the agents known for this purpose. Thus, the additive combination of hypochlorus, hypobromous or hypoiodous acid may be carried out with a solution thereof in an organic solvent, such as acetone or dioxane, or with a salt, ether or ester of such acid, or with an N-halogen-acetamide, for example, N-bromacetamide, or a halogen-dicarboxylic acid imide, for example, N-bromo- or N-chloro-succinimide, or with a halogen-amine. The reaction is advantageously carried out in the presence of a catalyst, for example, sulfuric acid, or perchloric acid. In order to bring about the additive combination of oxygen, there is used a peroxide, such as hydrogen peroxide, peracetic acid or monoperphthalic acid.

For the optional conversion of a 9:11-halogen-hydrin into a 9:11-epoxide of a steroid substituted in the 11-position by a methyl radical, there is used an agent capable of eliminating hydrogen halide, especially a hydroxide or oxide of a metal of the first or second group of the periodic system, for example, silver oxide, or a tertiary base such as pyridine or collidine, or aluminum oxide. It is often of advantage to use a tertiary base in conjunction with one of the aforesaid monovalent or divalent metal hydroxides or oxides. The 9:11-epoxide may be converted into its 9:11-halogen hydrin by the action of hydrogen fluoride, hydrogen chloride, hydrogen bromide or hydrogen iodide. The process which is carried out by way of the 9:11-epoxide is especially advantageous when a 9:11-bromhydrin is to be converted into a 9:11-fluorhydrin, 9:11-chlorhydrin or 9:11-iodohydrin.

The 9:11-epoxides so obtained can be converted by hydrolytic splitting, for example in an aqueous solvent in the presence of a strong acid, such as perchloric acid or by acylolysis, for example, acetolysis with acetic anhydride in the presence of an acid such as sufuric acid or perchloric acid, into their 9:11-dihydroxy-steroids or monoesters thereof, which contain an aliphatic hydrocarbon radical in the 11-position. On the other hand 9:11-dihydroxy-compounds can be obtained directly from the above-mention 9:11-unsaturated compounds by hydroxylating the latter, for example, by means of osmium tetroxide or iodine and a silver salt, such as silver benzoate.

In the products obtained by the process protected hydroxyl or oxo groups may be regenerated, if this has not already occurred in the course of the reactions mentioned above. Thus, ketals, such as ethylene-ketals, can be split up by treatment with a mineral acid or a sulfonic acid, at room temperature, advantageously in the presence of a ketone, such as acetone or pyroracemic acid, or by being gently heated with dilute acetic acid. Under similar acid conditions enol-ethers or tetrahydropyranyl ethers can be split up. Benzyl ethers can easily be split up with hydrogen in the presence of a catalyst, for example, palladium on a carrier, such as animal charcoal or an alkaline earth metal carbonate. On the other hand free hydroxyl or oxo groups present in the compounds obtained can be functionally convected as may be desired. Thus, free hydroxy groups may be esterified, e.g. with one of the above mentioned acids.

Into the pregnane-20-ones obtained as end products, which contain a a methyl radical in the 11-position and contain no hydroxyl groups in the 17- and/or 21-positions, these hydroxyl groups may be introduced in known manner, if desired. For introducing a 17α-hydroxyl group the product may, for example, be subjected to enol-acetylation in the 17:20-position followed by oxidation with a per-acid and alkaline hydrolysis. Various processes may also be used for forming a 21-hydroxyl group. Thus, for example, a 21-hydroxy-compound can be obtained by halogenation in the 21-position, reaction for the resulting 21-halide with a salt of an organic acid and mild alkaline hydrolysis or by microbiological hydroxylation.

If an oxo group is to be formed in the ring A, for example, an esterified hydroxyl group may be saponified with an alkali metal bicarbonate, carbonate or hydroxide and the hydroxyl group subsequently oxidized, for example, by means of chromium trioxide-pyridine complex or bromo-succinimide, or a ketalized oxo or enol-ether group may be converted by splitting with an aqueous acid in to a free oxo group. If desired, a double bond may be subsequently introduced into the 4:5- or 1:2-position or double bonds may be subsequently introduced into the 1:2- and 4:5-positions by a method in itself known, for example, by halogenation followed by the splitting off of hydrogen halide, by reaction with a selenium compound having a dehydrogenating action, such as selenium dioxide in the presence of a tertiary alcohol, or by microbiological methods.

The products of the invention are useful as medicaments or as intermediate products for making medicaments. Of special interest are the 11-methyl-pregnane derivatives which have in the rings and in the side chains the substituents and configuration of therapeutically active pregnane compounds, such as 11-methylated hydrocortisone, prednisolone, 9α-fluoro-hydrocortisone, 9α- fluoro-prednisolone, 9α-fluoro-16α-hydroxy-prednisolone, 6α- methyl-prednisolone, 6α-methyl-9α-fluoro-prednisolone, or aldosterone. These 11-methylated compounds can be used with advantage as medicaments in the place of the corresponding unmethylated compounds. Other 11-methylated steroids, which do not have in the rings and the side-chains the substituents and configurations of therapeutically active pregnane compounds may be converted into 11-methyl-pregnane compounds having such substituents and configurations by conventional methods.

11α - methyl - allopregnane-3β:11β-diol-20-one and its esters, for example the semi-esters of dicarboxylic acids, such as succinic acid etc., obtained by the process of the invention are distinguished by a hypotensive activity.

The following examples illustrate the invention:

Example 1

2.5 grams of magnesium shavings (activated with iodine) are covered wtih 120 cc. of tetrahydrofurane, and then gaseous methyl bromide is introduced. After 20 minutes the reaction sets in and the reaction is complete after a further 45 minutes. The dark colored reaction solution of methyl-magnesium bromide is diluted with 220 cc. of tetrahydrofurane, and then a solution of 1.5 grams of 11-keto-tigogenin (allospirostane-3β-ol-11-one) is added. The reaction solution is boiled for 65 hours under a current of nitrogen, while stirring, then the mixture is cooled and ice and a saturated solution of ammonium chloride are added. The tetrahydrofurane solution is washed with water, dried over sodium sulfate evaporated in vacuo, and the residue is recrystallized from acetone, whereby 1.2 grams of 11α-methyl-11β-hydroxy-tigogenin (11α-methyl-allospirostane-3β:11β-diol) melting at 217–220° C. are obtained. From the mother liquor a further 200 milligrams of the same 11-methyl-compound can be obtained. The infra-red absorption spectrum of 11α-methyl-11β-hydroxy-tigogenin no carbonyl bands.

Instead of 11-keto-tigogenin there may be used as starting material an ester thereof, for example, 11-keto-tigogenin-3-acetate.

Example 2

From 12.5 grams of magnesium shavings activated with iodine, 500 cc. of tetrahydrofurane and methyl bromide gas there is prepared in the manner described in Example 1 a methyl-magnesium bromide-solution, and a solution of 15 grams of allopregnane-3β-ol-11:20-dione-3-acetate-20-ethylene-ketal in 500 cc. of tetrahydrofurane is added. The reaction mixture is boiled for 43 hours in an atmosphere of nitrogen, the mixture is then cooled, decomposed with ice and saturated ammonium chloride solution, and the tetrahydrofurane solution is washed with water, dried over sodium sulfate, and evaporated in vacuo. The resulting crude product (15.8 grams) is recrystallized from acetone and there are obtained 11.25 grams of 11α-methyl-allopregnane-3β:11β-diol-20-one-20-ethylene-ketal melting at 181–182° C., which as indicated by its infra-red absorption spectrum is free from ketonic constituents. From the mother liquors two further crystalline fractions of the aforesaid 11-methyl-compound can be obtained, which are somewhat less pure, namely 1.5 grams melting at 175–179° C. and 1.08 grams melting at 146–149° C. In the latter fraction some allopregnane-3β-ol-11:20-dione-20-ethylene-ketal is still present.

In order to acetylate the 3β-hydroxyl group liberated during the reaction with methyl-magnesium bromide, 200 milligrams of the 11α-methyl-allopregnane-3β:11β-diol-20-one-20-ethylene ketal melting at 181–182° C. are dissolved in 2 cc. of pyridine and 2 cc. of acetic anhydride, and the whole is allowed to stand for 14 hours at room temperature. The reaction solution is then evaporated in vacuo at about 40° C., the residue is dissolved in a mixture of methylene chloride and ether (1:3), and the solution is washed with ice-cold dilute hydrochloric acid and water, dried over sodium sulfate and evaporated in vacuo. By crystallizing the residue from methanol there is obtained 11α-methyl-allopregnane-3β:11β-diol-20-one-3-acetate-20-ethylene-ketal melting at 140–143° C. This compound is not affected by chromic acid-pyridine complex after being stirred therewith at room temperature for 15 hours.

In order to split up the 20-ketal-group, 13.9 grams of 11α - methyl - allopregnane-3β:11β-diol-20-one-20-ethylene-ketal melting at 181–182° C. are dissolved in 370 cc. of acetone and, after the addition of 1.48 grams of paratoluene sulfonic acid, the whole is allowed to stand for 18 hours at room temperature. The reaction solution is then neutralized with sodium bicarbonate solution, evaporated in vacuo to about ⅓ of its volume, the reaction product crystallizes out and is then filtered off with suction. The residue is washed several times with water and dried. By recrystallization from acetone there are obtained 12.1 grams of 11α-methyl-allopregnane-3β:11β-diol-20 one melting at 180–186° C. The pure compound melts at 185–186° C.

In order to bring about acetylation in the 3-position 9.14 grams of 11α-methyl-allopregnane-3β:11β-diol-20-one are dissolved in 50 cc. of pyridine and 50 cc. of acetic anhydride and the whole is allowed to stand for 24 hours at room temperature. The reaction mixture is evaporated in vacuo at about 40° C., then taken up in ether, and the ethereal solution is washed with dilute hydrochloric acid and water, dried over sodium sulfate and evaporated in vacuo. By crystallizing the residue from a mixture of methylene chloride and ether there are obtained 8.2 grams of 11α-methyl-allopregnane-3β:11β-diol-20-one-3-acetate melting at 214–215° C. The compound is not affected by chromic acid-pyridine complex.

If acetic anhydride is replaced by succinic anhydride in the above example, there is obtained 11α-methyl-allopregnane-3β:11β-diol-20-one-3-hemisuccinate which is water-soluble for example in the form of the sodium salt, mono-, di- or triethanolamine salt.

*Example 3*

1 gram of 11α-methyl-allopregnane-3β:11β-diol-20-one-3-acetate melting at 214–215° C. is dissolved in 10 cc. of pyridine. After the addition of 0.75 gram of N-bromosuccinimide, the solution is stirred for ¼ hour at room temperature in an atmosphere of nitrogen, then cooled to −10° C. and sulfur dioxide gas is introduced at that temperature until a test portion of the reaction solution no longer colors acidified potassium iodide-starch paper. To the reaction solution there are then added 40 cc. of water, and the mixture is stirred while cooling with ice for a further hour and the precipitated reaction product is filtered off with suction. By crystallization from methanol there is obtained $\Delta^{9:11}$-11-methyl-allopregnene-3β-ol-20-one-3-acetate melting at 131–133° C., which gives a yellow coloration with tetranitromethane.

*Example 4*

372 milligrams of the $\Delta^{9:11}$-11-methyl-allopregnene-3β-ol-20-one-3-acetate melting at 131–133° C. described in Example 3 are dissolved in 10 cc. of glacial acetic acid and hydrogenated with 50 milligrams of a prehydrogenated platinum catalyst at 29° C. The hydrogenation ceases when 2 mols of hydrogen (44.8 cc.) have been absorbed. By filtering off the catalyst and evaporating the glacial acetic acid solution there is obtained crystalline 11-methyl-allopregnane - 3β:20 - diol-3-acetate, and without further purification the latter is oxidized in the 20-position by dissolving it in 5.5 cc. of pyridine, adding 370 milligrams of chromium trioxide, and stirring the mixture for 18 hours at room temperature. The mixture is then diluted with ice water, extracted with ether, and the ethereal solution is washed with dilute ice-cold hydrochloric acid and water, dried over sodium sulfate and evapoarted in vacuo. By crystallization from a mixture of ether and pentane, there is obtained 11-methyl-allopregnane-3β-ol-20-one-3-acetate melting at 133–135° C., which shows no coloration with tetranitromethane and gives a distinct melting point depression in admixture with $\Delta^{9:11}$ - 11 - methyl-allopregnene-3β-ol-20-one-3-acetate.

*Example 5*

1 gram of the $\Delta^{9:11}$-11-methyl-allopregnene-3β-ol-20-one-3-acetate melting at 131–133° C. described in Example 3 is dissolved in 50 cc. of acetone. A solution of 1 gram of N-bromacetamide in 25 cc. of water is then added in the course of 15 minutes at 12–14° C. There are then added dropwise at the same temperature 20 cc. of perchloric acid (obtained by diluting 3.3 cc. of the acid of 60% strength with water to 20 cc.), during which the reaction solution loses its color towards the end of the addition. The reaction product which is precipitated during the reaction is filtered off with suction and washed with acetone. By crystallization from acetone there is obtained 11α-methyl-allopregnane-3β:11β-diol-9α-bromo-20-one-3-acetate melting at 221–223° C. with decomposition.

*Example 6*

1.5 grams of the crude 11α-methyl-allopregnane-3β:11β-diol-9α-bromo-20-one-3-acetate obtained as described in Example 5 are dissolved in 75 cc. of ethanol, and after the addition of 840 milligrams of potassium hydroxide, the whole is allowed to stand at room temperature for 21 hours. The brown colored solution is concentrated at room temperature, diluted with water, extracted with ether and the ethereal solution is washed with water, dried over sodium sulfate and evaporated in vacuo. By crystallizing the residue from ether there is obtained 9β:11β-oxido-11α-methyl-allopregnane-3β-ol-20-one melting at 210–211° C.

*Example 7*

A mixture of 20 grams of $\Delta^{9:11}$-11-methyl-allopregnene-3β-ol-20-one-3-acetate, 200 cc. of carbon tetrachloride, 0.5 cc. of perchloric acid of 50% strength and 10 cc. of glacial acetic acid is stirred for 1½ hours at room temperature. The brown colored reaction mixture is cooled with ice, diluted with ether, and the organic solvent mixture washed with dilute sodium hydroxide solution and water and then evaporated in vacuo. As residue there is obtained the oily 20-enol acetate of the starting material which is dissolved without purification in 20 cc. of chloroform and mixed with one equivalent of a 2 N-ethereal monoperphthalic acid solution. After, being allowed to stand overnight at 15° C., the reaction solution is washed with dilute sodium hydrogen carbonate solution and water and, after being dried, is evaporated in vacuo. The enol acetate expoxide obtained as residue is dissolved in 150 cc. of 1 N-methanolic potassium hydroxide, heated for 10 minutes on a water bath, concentrated in vacuo to about half its volume and filtered with suction from crystalline $\Delta^{9:11}$-11-methyl-allopregnene-3β:17α-diol-20-one which, after crystallization from acetone, melts at 225–230° C.

*Example 8*

60 cc. of a 0.1 molar solution of bromine in chloroform are added dropwise at room temperature to a solution of 1 gram of $\Delta^{9:11}$-11-methyl-allopregnene-3β:17α-diol-20-one in 700 cc. of chloroform and 0.5 cc. of a 30% solution of hydrogen bromide and glacial acetic acid. After the reaction solution has lost its color, it is washed with dilute sodium hydrogen carbonate solution and water and evaporated under reduced pressure. The crystalline $\Delta^{9:11}$-11-methyl-21-bromo-allopregnene-3β:17α-diol-20-one melts at about 235° C. with decomposition.

320 mg. of potassium carbonate, 0.2 cc. of glacial acetic acid and 160 mg. of potassium iodide are added to a solution of 260 mg. of the above bromide in 60 cc. of boiling acetone, and the mixture is boiled for 5 hours. The reaction mixture is then evaporated under reduced pressure to about ⅓ of its volume and poured into ice water. The precipitated $\Delta^{9:11}$-11-methyl-allopregnene-3$\beta$:17$\alpha$:21-triol-20-one-21-acetate melts at 225–230° C. after being recrystallized from acetone.

1 gram of $\Delta^{9:11}$-11-methyl-allopregnene-3$\beta$:17$\alpha$:21-triol-20-one-21-acetate is dissolved in 20 cc. of methylene chloride and 2 cc. of pyridine, 1 gram of bromosuccinimide is added and the whole stirred overnight at room temperature. The clear solution of the reaction mixture is stirred with water and sodium bisulfite solution of 30% strength, separated, the methylene chloride solution washed with water and sodium hydrogen carbonate solution, dried and evaporated under reduced pressure. The resulting $\Delta^{9:11}$-11-methyl-allopregnene-17$\alpha$:21-diol-3:20-dione-21-acetate melts at 215–220° C. after recrystallization from acetone.

Example 9

A solution of 1 gram of bromosuccinimide in 25 cc. of water is added dropwise with stirring to a solution of 1 gram of $\Delta^{9:11}$-11-methyl-allopregnene-17$\alpha$:21-diol-3:20-dione-21-acetate in 50 cc. of acetone. 20 cc. of a 0.8 N-aqueous solution of perchloric acid are then added. After half an hour sodium bisulfite solution is added and the reaction solution loses its color, and is then poured into water. The precipitated 11$\alpha$-methyl-9$\alpha$ - bromo - allopregnane - 11$\beta$:17$\alpha$:21-triol-3:20-dione-21-acetate is filtered with suction, dissolved in 30 cc. of methanol and one equivalent of 0.1 N-sodium hydroxide solution is added. The resulting mixture is poured into water, whereupon 11$\alpha$-methyl-9$\beta$:11$\beta$-oxido-allopregnane-17$\alpha$:21-diol-3:21-dione-21 - acetate crystallizes out.

To a solution of 0.5 gram of the above epoxide in 10 cc. of methylene chloride there are added 2 cc. of aqueous hydrogen fluoride of 48% strength, and the reaction mixture is stirred for 5 hours at room temperature and is then poured into dilute sodium hydrogen carbonate solution. The precipitated reaction product is extracted with methylene chloride, washed with water, and after being dried is evaporated under reduced pressure. After recrystallization from a mixture of methylene chloride and ether 11$\alpha$-methyl-9$\alpha$-fluoro-allopregnane-11$\beta$:17$\alpha$:21-triol-3:20-dione-21 acetate melts at 245–250° C. with decomposition.

Example 10

A suspension of 500 mg. of 11$\alpha$-methyl-9$\alpha$-fluoro-allopregnane - 11$\beta$:17$\alpha$:21 - triol - 3:20 - dione - 21-acetate in 25 cc. of anhydrous t-butanol, 200 mg. of selenium dioxide and 0.05 cc. of pyridine is boiled under reflux for 70 hours in an atmosphere of nitrogen. After cooling, the mixture is diluted with 50 cc. of ethyl acetate, filtered over Celite and the organic solvents evaporated under reduced pressure. The residue is adsorbed on 25 grams of aluminum oxide and eluted with a mixture of benzene and ether, and ether. The crystalline fractions are combined and recrystallized from a mixture of acetone and hexane. The resulting $\Delta^{1:4}$-11$\alpha$-methyl-9$\alpha$ - fluoro - pregnadiene - 11$\beta$:17$\alpha$:21 - triol - 3:20-dione-21-acetate melts at 215–220° C.

For the purpose of hydrolyzing the 21-acetate a solution of 100 mg. of the above 21-acetate in 20 cc. of methanol is mixed with 1 molar equivalent of sodium methylate at 0° C. in an atmosphere of nitrogen. After 15 minutes the mixture is neutralized with acetic acid, evaporated under reduced pressure, diluted with water and filtered from precipitated $\Delta^{1:4}$-11$\alpha$-methyl-9$\alpha$-fluoro-pregnadiene-11$\beta$:17$\alpha$:21-triol-3:20-dione.

Instead of sodium methylate there may be used a corresponding quantity of sodium hydroxide or potassium hydroxide for the hydrolysis.

Example 11

500 mg. of $\Delta^{1:4}$-11$\alpha$-methyl-9$\alpha$-fluoro-pregnadiene-11$\beta$:17$\alpha$:21-triol-3:20-dione are dissolved in 10 cc. of pyridine, cooled, and 1 cc. of trimethylacetic acid chloride is added dropwise. After allowing the mixture to stand overnight at room temperature, the reaction mixture is poured into ice water, extracted with methylene chloride, washed with ice-cold sodium hydrogen carbonate solution and water, and, after drying, the solvent is evaporated under reduced pressure. As residue there is obtained $\Delta^{1:4}$ - 11$\alpha$ - methyl-9$\alpha$ - fluoro-pregnadiene-11$\beta$:17$\alpha$:21-triol-3:20-dione-21-trimethyl acetate.

If in the above example instead of trimethylacetic acid chloride there is used acetic anhydride, cyclopentylpropionic anhydride, phenylpropionic anhydride or succinic anhydride, there is obtained the 21-acetate, 21-cyclopentylpropionate, 21-phenylpropionate and 21-hemisuccinate respectively of $\Delta^{1:4}$-11$\alpha$-methyl-9$\alpha$-fluoro-pregnadiene-11$\beta$:17$\alpha$:21-triol-3:20-dione.

Example 12

1 gram of $\Delta^{9:11}$-11-methyl-allopregnene-3$\beta$-ol-20-one-3-acetate is dissolved in 10 cc. of ether, one drop of piperidine and 1 cc. of hydrocyanic acid are added at 0° C. in succession, and the whole is stirred for 2½ hours at room temperature. After evaporating the mixture under reduced pressure, the residue is dissolved in ether washed with dilute hydrochloric acid and water, dried and evaporated under reduced pressure. The resulting $\Delta^{9:11}$-11-methyl-20-cyano-allopregnene-3$\beta$:20-diol-3-acetate melts at 155–160° C. after being recrystallized from ether.

1 gram of the $\Delta^{9:11}$-11-methyl-20-cyano-allopregnene-3$\beta$:20-diol-3-acetate obtained is dissolved in 3.2 cc. of pyridine, and 0.47 cc. of phosphorus oxychloride is added at 0° C. After allowing the mixture to stand for 14 hours at room temperature it is poured onto ice, extracted with ether, washed with dilute hydrochloric acid and water and, after drying, the ether is evaporated under reduced pressure. The resulting $\Delta^{9:11:17:20}$-11-methyl-20-cyano-allopregnadiene-3$\beta$-ol-3-acetate melts at 154–156° C. after recrystallization from a mixture of ether and pentane.

After reacting the above unsaturated nitrile with monoperphthalic acid followed by hydrolysis with potassium hydroxide solution as described in Example 7 there is obtained $\Delta^{9:11}$-11-methyl-allopregnene - 3$\beta$:17$\alpha$ - diol-20-one melting at 225–230° C.

Example 13

A few drops of hydrogen bromide in glacial acetic acid and then a solution of 300 mg. of bromine in 5 cc. of glacial acetic acid are added to a solution of 300 mg. of 11$\alpha$ - methyl - 9$\alpha$-bromo-allopregnane - 11$\beta$:17$\alpha$:21-triol-3:20-dione-21-acetate in 40 cc. of glacial acetic acid. As soon as the reaction solution loses its color, it is poured into ice water and extracted with methylene chloride, washed with sodium hydrogen carbonate and water, and the solvent is dried and evaporated under reduced pressure. The residue is crude 11$\alpha$-methyl-2:4:9$\alpha$-tribromo-allopregnane-11$\beta$:17$\alpha$:21-triol-3:20-dione-21-acetate.

0.3 cc. of bromine is added with cooling to 7.5 cc. of acetone. After decoloration, 0.7 gram of sodium carbonate is added. The mixture is then filtered and the filtrate added to 30 cc. of acetone containing 7 grams of iodine. After heating the resulting solution for some minutes at the boil, 1.5 grams of the above tribromide are added and the whole is boiled for 2½ hours. After the addition of 1.4 grams of oxalic acid the mixture is boiled for another hour, allowed to cool and 30 cc. of ethyl acetate are added. The mixture is filtered off from the precipitate. The filtrate is washed with water, sodium hydrogen carbonate solution and water. By adding 3.5 grams of zinc dust and 0.5 cc. of glacial acetic acid the iodiferous solution loses its color. The solution is then filtered and the filtrate washed with sodium hydrogen carbonate and water and after being dried, evaporated. As residue there is obtained 11$\alpha$-methyl-9$\alpha$-bromo-hydrocortisone-acetate.

By following the directions given in Example 9 11$\alpha$- methyl-9α-bromo-hydrocortisone-acetate can be converted via Δ⁴-11α-methyl-9β:11β-oxido-pregnene-17α:21-diol-3:20-dione-21 acetate into 11α-methyl-9α-fluoro-hydrocortisone-acetate. By subjecting the above epoxide to the action of hydriodic acid there is obtained 11α-methyl-9α-iodo-hydrocortisone-acetate which can be reduced to 11α-methyl-hydrocortisone-acetate by treatment with Raney nickel in ethanol.

*Example 14*

To a solution of 38.4 grams of oxalic acid dimethyl ester in 250 cc. of benzene there are added first 9.4 grams of pulverized sodium methylate and then in portions a solution of 21.6 grams of Δ⁹˙¹¹-11-methyl-allopregnene-3β-ol-20-one-3-acetate in 500 cc. of benzene. The mixture is stirred for 5 hours in an atmosphere of nitrogen, then cooled and 200 cc. of water and 30 cc. of glacial acetic acid are added. The benzene solution is washed with water, dried and evaporated under reduced pressure. The Δ⁹˙¹¹-11 - methyl-allopregnene-3β-ol-20-one-21-oxalo acid methyl ester obtained as residue melts at 206–208° C. with decomposition after crystallization from a mixture of methylene chloride and ether.

To a suspension of 5 grams of the above oxalic acid methyl ester in 120 cc. of absolute methanol there are added at 0–5° C. 20 cc. of a 0.5 N-methanolic sodium methylate solution and then 70 cc. of a 0.15-molar anhydrous methanolic iodine solution. 25 cc. of 0.5 N-methanolic sodium methylate solution are added in the course of 8 hours and the whole is then stirred for another two hours at 0° C. The reaction mixture is neutralized by adding 0.5-molar sodium dihydrogen phosphate solution, diluted with 200 cc. of methanol of 50% strength and stirred for 16 hours at 0–5° C. The reaction mixture is extracted with a mixture of methylene chloride and ether, the solvent is dried after being washed with water and then evaporated under reduced pressure. The resulting residue is crude Δ⁹˙¹¹-11methyl-21-iodo-allopregnene-3β-ol-20-one.

3 grams of the above 21-iodide are boiled under reflux together with 160 cc. of acetone, 12.5 grams of potassium hydrogen carbonate and 7.5 cc. of glacial acetic acid for 4 hours. The mixture is then evaporated under reduced pressure, the residue poured into water, extracted with a mixture of methylene chloride and ether, and the solvent evaporated under reduced pressure after being washed with water and dried. The resulting Δ⁹˙¹¹-11-methyl-allopregnene-3β:21-diol-20-one-21-acetate melts at 187–188° C. after recrystallization from a mixture of methylene chloride and ether.

By acetylation of the above compound (1 gram) by means of 10 cc. of acetic anhydride and 10 cc. of pyridine at room temperature there is obtained Δ⁹˙¹¹-11-methyl-allopregnene-3β:21-diol-20-one-3:21-diacetate which, after crystallization from a mixture of methanol and water, melts at 115–116° C.

*Example 15*

1.5 grams of Δ⁵-3:3-ethylene-dioxy-11-keto-17α-methyl-17β-acetoxy-androstene (prepared by acetylating 11-keto-17α-methyl-testosterone with acetic anhydride and pyridine at 130° C., and 3-ketalizing the resulting 11-keto-17α-methyl-testosterone acetate by means of ethylene glycol-paratoluenesulfonic acid in benzene solution) are boiled under reflux as described in Example 1 with a tetrahydrofurane solution of methyl-magnesium bromide (from 2.5 grams of magnesium) for 36 hours. The Δ⁵-3:3-ethylene-dioxy-11α:17α-dimethyl-androstene-11β:17β-diol obtained after working up can be split to 11α:17α-dimethyl-11β-hydroxy-testosterone by the method described in Example 2.

What is claimed is:
1. An 11α-methyl allopregnane compound of the formula

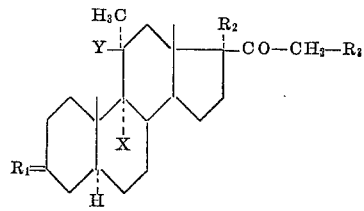

wherein X represents a hydrogen atom, Y a member selected from the group consisting of a β-hydroxy group and a hydrogen atom, X and Y taken together a member selected from the group consisting of a double bond and an oxido group, $R_1$ a member selected from the group consisting of a free oxo group, an oxo group ketalized with ethylene glycol, a free hydroxy group, an esterified hydroxy group, a hydrocarbon ether, $R_2$ a member selected from the group consisting of hydrogen and a free hydroxyl group and $R_3$ a member selected from the group consisting of hydrogen, a free and an esterified hydroxyl group.

2. 11α methyl-allopregnane-3β:11β-diol-20-one.
3. The 3-acetate of the compound claimed in claim 2.
4. The 3-hemisuccinate of the compound claimed in claim 2.
5. The sodium salt of the compound claimed in claim 4.
6. 11α - methyl - 9α - fluoro - prednisolone - 21 - trimethyl - acetate.

References Cited in the file of this patent

UNITED STATES PATENTS

| | | |
|---|---|---|
| 2,640,838 | Wendler | June 2, 1953 |
| 2,740,798 | Ralls | Apr. 3, 1956 |
| 2,751,379 | Sondheimer et al. | June 19, 1956 |
| 2,763,671 | Fried et al. | Sept. 18, 1956 |
| 2,773,077 | Conbere | Dec. 4, 1956 |
| 2,776,968 | Djerassi et al. | Jan. 8, 1957 |
| 2,783,254 | Gould et al. | Feb. 26, 1957 |
| 2,825,735 | Rosenkranz et al. | Mar. 4, 1958 |
| 2,833,795 | Graber | May 6, 1958 |
| 2,837,541 | Hirschmann et al. | June 3, 1958 |
| 2,838,533 | Berkely | June 10, 1958 |
| 2,876,238 | Graber et al. | Mar. 3, 1959 |
| 2,880,204 | Fonken et al. | Mar. 31, 1959 |
| 2,885,412 | Hirschmann et al. | May 5, 1959 |

FOREIGN PATENTS

| | | |
|---|---|---|
| 765,888 | Great Britain | Jan. 16, 1957 |

OTHER REFERENCES

"Natural Products Related to Phenanthrene," Fieser and Fieser, 3rd ed., pp. 373–85.
Marker et al.: J.A.C.S., 64, 1280 (1942).
Callow et al.: Journal of Chem, Soc. (1956), pp. 4739–43.
Robinson et al.: J.A.C.S., 81, 408–10 (1959).